United States Patent [19]
Huber

[11] 3,856,786
[45] Dec. 24, 1974

[54] SULFONYLDIISOCYANATE ADDUCTS
[75] Inventor: Ludwig Konrad Huber, King of Prussia, Pa.
[73] Assignee: Pennwalt Corporation, Philadelphia, Pa.
[22] Filed: July 25, 1972
[21] Appl. No.: 274,926

[52] U.S. Cl............. 260/243 R, 424/246, 260/554, 260/553 A, 260/553 D, 260/481 C, 260/470
[51] Int. Cl............................................ C07d 93/00
[58] Field of Search ................................ 260/243 R

[56] References Cited
UNITED STATES PATENTS
3,711,475   1/1973   Disselkotter ................ 260/243

Primary Examiner—John M. Ford
Attorney, Agent, or Firm—Carl A. Hechmer, Jr.

[57] ABSTRACT

Cyclic adducts of the structure

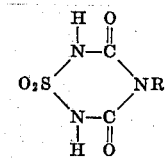

and linear derivatives of the structure

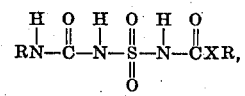

where R and R' are organic radicals and X is oxygen, nitrogen or sulfur, exhibit bacteriostatic and fungistatic activity.

4 Claims, No Drawings

SULFONYLDIISOCYANATE ADDUCTS

This invention relates to new sulfonyldiisocyanate adducts. More particularly, the invention concerns cyclic 1:1 adducts of primary amines or hydrazines with sulfonyldiisocyanate, and to linear addition products obtained by reacting said cyclic adduct with organic compounds containing oxygen-hydrogen, nitrogen-hydrogen or sulfur-hydrogen bonds.

N. Onodera, Chem. Abst. 59, 13820 d (1963), reported the preparation of some linear 1:2 adducts of sulfonyldiisocyanate and amines. It has now been discovered that a carefully controlled reaction between sulfonyldiisocyanate, $SO_2(NCO)_2$, and a primary amine, hydrazine, or substituted hydrazine, produces a cyclic 1;1 adduct. The reaction is carried out by adding the amine or hydrazine reactant to the sulfonyldiisocyanate, preferably both reactants being dissolved in an inert solvent, such as benzene, toluene, diethyl ether, tetrahydrofuran, or chloroform. The addition is carried out so that only a small amount of the amine or hydrazine is available at any time for reaction with the diisocyanate, such as by incremental addition or by slow continuous addition. Essentially stoichiometric (equimolar) proportions of amine or hydrazine are employed. By adhering to these conditions, the formation of significant amounts of the linear di-adduct, as mentioned above, is avoided. The temperature of the present reaction can vary from about 0°C to about 150°C, with a range of about 20°C to 70°C being preferred. The cyclic adduct product generally precipitates as a crystalline solid from the reaction solvent and may be recovered by filtration.

The cyclic 1:1 adduct of this invention may be represented by the structure:

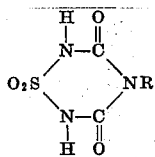

where the R moiety is the residue of the amine of hydrazine reactant and is a radical selected from the class consisting of alkyl (e.g., having one to 20 carbon atoms), aryl (e.g., having six to 18 carbon atoms), alkylaryl (e.g., having from seven to 20 carbon atoms), arylalkyl (e.g., having seven to 20 carbon atoms), amino or aminoalkyl (e.g., having up to 20 carbon atoms), aminoaryl (e.g., having six to 18 carbon atoms), aminoalkylaryl (e.g., having seven to 20 carbon atoms), and aminoarylalkyl (e.g., having seven to 20 carbon atoms). Said radicals may contain one or more groups that are non-reactive with respect to the sulfonyldiisocyanate, for example, ether, sulfide, amine, sulfoxide, sulfone, halogen, nitro, or an ester group. Representative primary amine and hydrazine reactants i.e., $H_2NR$, operable in producing the compounds of this invention are methylamine, ethylamine, isopropylamine, 2-ethylhexylamine, dodecylamine, octadecylamine, cyclopropylamine, cyclooctylamine, 2-adamantanamine, allylamine, N,N-dimethyl-1,3-propanediamine, 3-methoxy-n-propylamine, 4-2-aminopropyl morpholine, 2-methylthioethylamine, 3-chloropropylamine, 3-methylsulfonyl-1-propylamine, ethyl-γ-aminobutyrate, p-toluidine, m-fluorobenzylamine, α-methylphenylethylamine, 2-(p-chlorophenyl)ethylamine, 3-phenyl-1-propylamine, hydrazine, 1,1-dimethylhydrazine, 1,1-methyloctyl-hydrazine, 1,1-didecylhydrazine, N-aminohexamethyleneimine, N-aminomorpholine, 3-amino-2-oxazolidinone, p-nitrophenylhydrazine, 1,1-diphenylhydrazine, 1,1-dibenzylhydrazine, and the like. The reaction may be depicted by the following equation showing formation of the cyclic adduct by reacting the sulfonyldiisocyanate with the primary amine or hydrazine.

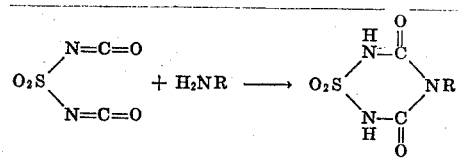

In contrast to the cyclic monoadduct of sulfonyldiisocyanate and ammonia which simply forms the cyclic di-ammonium salt when reacted with excess ammonia (R. Appel and H. Gerber, Chem. Ber. 91, 1200 (1958)), the cyclic adduct embodied herein undergoes a ring-opening reaction when reacted with a compound containing a reactive nitrogen-hydrogen, oxygen-hydrogen or sulfur-hydrogen bond, for example, such reactants as amines, typified by ethylamine, octylamine, dimethylamine, cyclohexylamine, hexamethylenimine, morpholine, 3,4-dichloroaniline, 0-toluidine, 4-aminopyridine, benzylamine, ethylenediamine, ethanolamine; alcohols, as exemplified by ethanol, octanol, allyl alcohol, 2-ethyl-1-hexanol, 2-methoxy ethanol, ethylene glycol monoacetate, phenol, 3,4-dichlorophenol, benzylalcohol; mercaptans, as exemplified by butanethiol, cyclohexanethiol, ethyl 2-mercaptoacetate, butyl 3-mercaptopropionate, thiophenol, p-methoxy benzenethiol, 2-mercapto benzothiazole; hydrazines, as exemplified by hydrazine, ethylhydrazine, hexylhydrazine, 1,1-dimethylhydrazine, 1,3-dimethyldrazine, phenylhydrazine, 2,4-dinitrophenylhydrazine, 2,4,6-trichlorophenylhydrazine; and hydroxylamines, as exemplified by N-ethylhydroxylamine, N,N-diethylhydroxylamine, 0-methylhydroxylamine.

The N,N' - substituted sulfonyl compounds produced by the ring-opening reaction of the cyclic adduct and the active-hydrogen containing compound as described above can be represented by the structure:

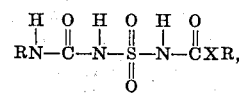

where R is as defined earlier, X is oxygen, nitrogen or sulfur, and R' is the residue of a compound of the formula R'XH, i.e., an amine, alcohol, mercaptan, hydrazine or hydroxylamine, R' being the organic moiety remaining after reaction of the reespective XH group pendant thereto; R' will, in general, contain from one to about 20 carbon atoms. This ring opening reaction can be carried out at temperatures ranging from about 10°C to 150°C, but since the reaction is usually spontaneous, ambient temperatures are normally adequate. A non reactive liquid, such as benzene, toluene, tetrahydrofuran, p-dioxane or dimethylformamide, can advantageously be used as reaction medium, or an excess of the HX - containing reactant can serve as the solvent medium. The product usually separates as a solid, either directly or upon concentration and/or cooling of the reaction mixture, and is readily recovered by filtration.

The cyclic 1:1 adducts embodied herein and the linear di-adducts derived therefrom by the aforedescribed ring opening mechanism are pesticidally active and are useful in inhibiting the growth of and in killing a wide spectrum of microorganisms such as bacteria, fungi and algae, including Staphylococcus aureus, Escherichia coli and Aspergillus niger. Other representative bacterium and fungus species against which the compounds can be used are Pullularia pullulans, Chaetomium globossum, Ventural inaequalis, podosphaera leucotricha, Puccinia recondita, Trichophyton interdigitale, Rhizopus stolonifer and Aphanomyces euteiches.

The various products derived from hydrazines are also useful as blowing agents for producing foamed products. When heated to elevated temperatures these compounds decompose with formation of considerable amounts of gases, which, depending on the particular system, can be entrapped to result in foamed materials, such as foamed urethane resins or foamed vinyl resins.

The invention is illustrated and clarified by reference to the following representative examples.

EXAMPLE 1

Benzylamine (10.7 g., 0.1 mole) in solution in benzene (20 ml.) is added dropwise over a one hour period to a solution of sulfonyldiisocyanate (14.8 g., 0.1 mole) in benzene (20 ml.). The reaction mixture is stirred and maintained at about 30°C by external cooling of the pot. The resulting slurry is heated at reflux for 5 minutes, stirred at ambient temperature for 16 hours and again heated to reflux for 2 hours. After cooling to room temperature the solids are separated from the benzene medium by filtration to yield 22g. of crude white product, m.p., ca. 160°C. Eight grams of this crude product is extracted with about 50 ml. cold methanol, the cold extract is evaporated under high vacuum and the sticky white residue is dissolved in 40 ml. diethyl ether, and when the ether solution is concentrated to about 7 ml. volume, a white solid is formed which is separated, triturated with benzene, dried under vacuum and shown by analysis to be the mono-adduct, 4-benzyl-3, 5-dioxo-1,2,4,6-thiatriazine-1, 1-dioxide, m.p., 193°C., having the structure:

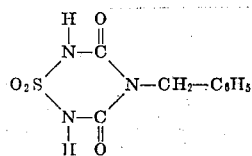

Analysis:
Calculated for $C_9H_9N_3O_4S$: C, 42.35; H, 3.55; N, 16.47%
Found: C, 42.35; H, 3.66; N, 16.49%

EXAMPLE 2

1,1-dimethylhydrazine (6 g., 0.1 mole) in solution in 50 ml. benzene is added dropwise to a well stirred solution of sulfonyldiisocyanate (16.5g., 0.11 mole) in 50 ml. benzene over a period of 1.5 hours, the exothermic heat of reaction raising the temperature of the mixture from 27°C up to 37°C. The reaction mixture, in which a yellowish solid is precipitated, is stirred at ambient temperature for 1 day, and for 5 hours at reflux. The solids are then separated by filtration and dried under high vacuum at ambient temperature to give 23 grams of light yellow powder, corresponding to an essentially quantitative yield Five grams of the product is extracted with dry diethyl ether for 12 hours in a Soxhlet apparatus to yield a purified mono adduct, 4-dimethylamino-3,5-dioxo-1,2,4,6-thiatriazine-1, 1-dioxide, having the structure:

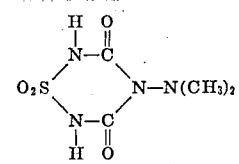

Analysis:
Calculated for $C_4H_8N_4O_4S$: C, 23.08; H, 3.87; N, 26.91%
Found: C, 24.44; H, 3.55; N, 26.66%

The above prepared compound exhibits good bacteriostatic and fungistatic activity as shown by representative tests using the "Agar Dilution method," in which Staphylococcus aureus, E. Coli and Asperillus niger are effectively controlled at concentrations of 500 ppm. of the active compound. The compound is also useful as a blowing agent for making foams. When heated to about 130°C, it melts with evolution of considerable amounts of gas resulting in a voluminous foaming of the host medium.

EXAMPLES 3 – 5

The ring opening reactions of the cyclic mono-adducts of this invention are illustrated by reacting the above prepared 4-dimethylamino - 3, 5-dioxo-1, 2, 4, 6-thiatriazine - 1, 1-dioxide, with various compounds, e.g., amines, hydrazines, and alcohols. For example, reaction of the cyclic mono-adduct with o-toluidine at about 40°C gives the 1:1 addition product, 1,1-dimethyl-4[3-o-tolylureido)sulfonyl]semicarbazide, m.p., 158°C with decomposition, having the structure:

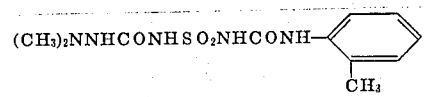

Reaction of the cyclic mono-adduct with ethanol at about 70°C gives the 1:1 adduct, 1,1-dimethyl-4]N-(carbethoxy)sulfamoyl]semicarbazide, m.p. 68°–75°C, having the structure:

$(CH_3)_2NNHCONHSO_2NHCO_2C_2H_5$

Reaction of the cyclic mono-adduct with N,N-dimethylhydrazine in tetrahydrofuran solvent at 65°C produces the 1:1 adduct 1,7-bis(dimethylamino)-4-sulfonyltriuret, a yellow solid, having the structure:

$[(CH_3)_2NNHCONH]_2SO_2$

The bacteriostatic and fungistatic activity of these linear derivatives is demonstrated by the inhibiting activity (Agar Dilution Method) of the 1,1-dimethyl-4[3-o-tolylureido)sulfonyl]semicarbazide against E. coli at concentration of 10 ppm. and against Aspergillus niger at concentration of 100 ppm.

What is claimed is:

1. The cyclic compound represented by the structure

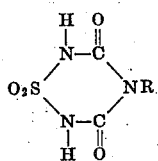

where R is selected from the group consisting of alkyl having one to 20 carbon atoms, aryl having six to 18 carbon atoms, alkylaryl having from seven to 20 carbon atoms, amino, aminoalkyl having up to 20 carbon atoms, aminoaryl having six to 18 carbon atoms, aminoalkylaryl having seven to 20 carbon atoms, and aminoarylalkyl having seven to 20 carbon atoms.

2. The compound according to claim 1 wherein R is the benzyl radical.

3. The compound according to claim 1 wherein R is $-N(CH_3)_2$.

4. The method of preparing the cyclic compound of claim 1 which comprises contacting a compound of the formula $H_2NR$ with sulfonyldiisocyanate wherein by incremental addition only a small amount of said compound is available at any time for reaction with the sulfonyldiisocyanate, to thereby preclude formation of linear adducts.

* * * * *